(12) United States Patent
Krstic et al.

(10) Patent No.: US 11,100,242 B2
(45) Date of Patent: Aug. 24, 2021

(54) RESTRICTED RESOURCE CLASSES OF AN OPERATING SYSTEM

(71) Applicant: Apple Inc., Cupertino, CA (US)

(72) Inventors: Ivan Krstic, Sunnyvale, CA (US); Pierre-Olivier J. Martel, Mountain View, CA (US); Austin G. Jennings, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 479 days.

(21) Appl. No.: 14/292,705

(22) Filed: May 30, 2014

(65) Prior Publication Data
US 2015/0347774 A1    Dec. 3, 2015

(51) Int. Cl.
*G06F 21/62* (2013.01)
*G06F 21/44* (2013.01)

(52) U.S. Cl.
CPC ......... *G06F 21/6218* (2013.01); *G06F 21/44* (2013.01); *G06F 21/62* (2013.01)

(58) Field of Classification Search
CPC ...................................................... G06F 9/468
See application file for complete search history.

(56) References Cited

U.S. PATENT DOCUMENTS

| | | | |
|---|---|---|---|
| 5,815,574 A * | 9/1998 | Fortinsky ............ | G06F 21/6218 713/153 |
| 6,233,576 B1 * | 5/2001 | Lewis .................... | G06F 9/468 |
| 6,279,111 B1 * | 8/2001 | Jensenworth ......... | G06F 21/335 713/159 |
| 6,308,274 B1 * | 10/2001 | Swift .................... | G06F 21/604 710/200 |
| 6,470,339 B1 * | 10/2002 | Karp ...................... | G06F 9/468 707/704 |
| 7,350,204 B2 | 3/2008 | Lambert et al. | |
| 7,434,257 B2 * | 10/2008 | Garg .................... | G06F 9/4428 707/999.009 |
| 7,802,294 B2 * | 9/2010 | Perlin ................. | G06F 21/6218 713/172 |
| 8,239,954 B2 | 8/2012 | Wobber et al. | |
| 8,601,531 B1 | 12/2013 | Zolfonoon et al. | |
| 2002/0186260 A1 * | 12/2002 | Young ................... | G06F 21/604 715/853 |
| 2005/0213763 A1 * | 9/2005 | Owen ................. | H04L 63/0442 380/270 |
| 2006/0005230 A1 * | 1/2006 | England ................. | G06F 21/53 726/1 |

(Continued)

*Primary Examiner* — Jorge A Chu Joy-Davila
(74) *Attorney, Agent, or Firm* — Womble Bond Dickinson (US) LLP

(57) ABSTRACT

Techniques for access control of a data processing system are described. In one embodiment, in response to a request from an application for accessing a resource of a data processing system, it is determined a first class of resources the requested resource belongs. A second class of resources the application is entitled to access is determined based on a resource entitlement encoded within the application and authorized by a predetermined authority. The application is allowed to access the resource if the first class and the second class of resources are matched. The application is denied from accessing the resource if the first class and the second class are not matched, regardless an operating privilege level of the application.

30 Claims, 10 Drawing Sheets

(56) References Cited

U.S. PATENT DOCUMENTS

| | | | |
|---|---|---|---|
| 2006/0294578 A1* | 12/2006 | Burke | G06F 21/604 726/2 |
| 2007/0016773 A1* | 1/2007 | Perlman | G06F 21/6218 713/166 |
| 2007/0056044 A1* | 3/2007 | Illg | H04L 63/08 726/27 |
| 2007/0136465 A1* | 6/2007 | Fernandes | H04L 63/104 709/225 |
| 2007/0289006 A1* | 12/2007 | Ramachandran | H04L 63/08 726/10 |
| 2008/0022370 A1 | 1/2008 | Beedubail et al. | |
| 2008/0088871 A1* | 4/2008 | Fukasawa | G06F 21/608 358/1.15 |
| 2009/0276834 A1* | 11/2009 | Bloesch | G06F 21/6218 726/4 |

* cited by examiner

RESTRICTED RESOURCE CLASSES OF AN OPERATING SYSTEM

FIELD OF THE INVENTION

Embodiments of the present invention relate generally to an operating system of a data processing system. More particularly, embodiments of the invention relate to restricted resource classes of an operating system.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses," "worms," "Trojan horses," "spyware," "adware," and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDA's"); music and video players; network routers, switches or bridges; and other devices utilizing a microprocessor, microcontroller, or a digital signal processor, to execute coded instructions have been the subjects of attacks by malicious code.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, most of these techniques are ineffective if the malware gains access or operating privilege (e.g., root privilege or administrative privilege).

For example, in a conventional operating system, once the malware gains certain accessing privilege, such as root or administrative privilege, it can cause significant damage to the system. One of the most significant damage will be modify certain security settings of certain system components or applications running within an operating system, which in turn destroys all or most of the security measures of the system. There has been a lack of efficient security prevention mechanisms to prevent such malware even if it gained the necessary accessing privileges.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
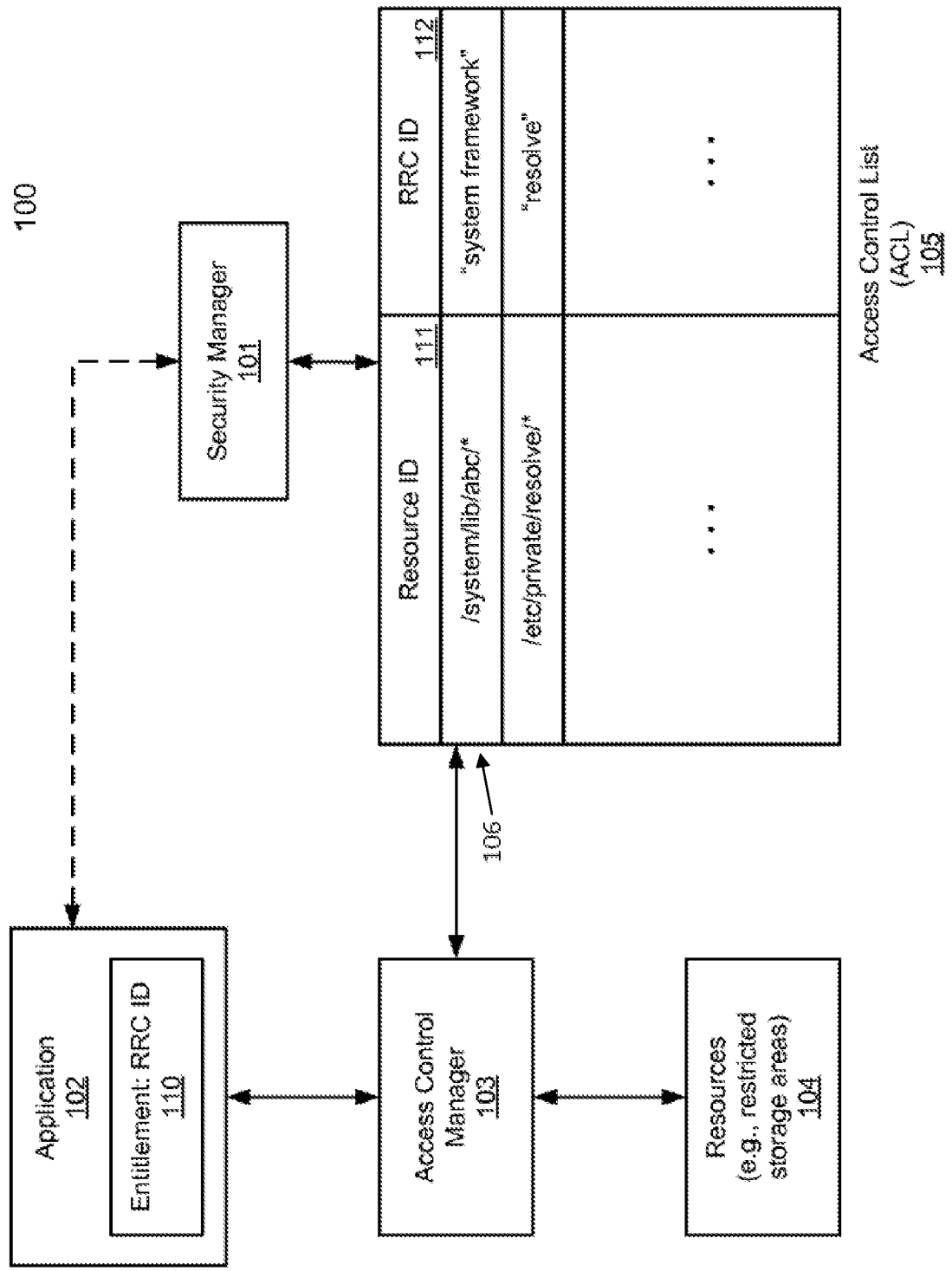
FIG. 1 is a block diagram illustrating an example of access control system of an operating system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, certain resources of a data processing system are designated as restricted resources and such resources are categorized in different restricted resource classes (RRCs) or types. A resource associated with a particular RRC can only be accessed by a software program that belongs to that particular RRC and authorized as a part of RRC entitlements by a proper authority. In one embodiment, the RRC entitlements may be authorized and signed by a predetermined authority, such as Apple Inc®, and encoded within an executable image of a software program, such that the RRC entitlements are securely protected and difficult to temper.

According to one embodiment, an access control list (ACL) may be centrally maintained for the restricted resources by an access control system of an operating system. The ACL may identify some or all of the restricted resources and the respective RRC classes associated with the restricted resources. When an application requests to access a particular resource, the access control system looks up in the ACL based on a resource ID identifying the requested resource to determine whether requested resource is a part of a restricted resource class. If the requested resource is a restricted resource, the access control system identifies from an entry of the ACL corresponding to the requested resource an RRC identifier. The RRC identifier obtained from the ACL is compared with the RRC identifier retrieved from the executable image of the application. If both RRC identifiers match, it means that the application is entitled to access the requested resource. Otherwise, the application's request is denied, even though the application may have the highest the accessing privilege level, such as root or administrative level. Therefore, even though a malware somehow illegally gains the root or administrative privilege, the malware cannot access the resource because the malware does not possess the proper RRC entitlements in its executable image that has been authorized and signed by a proper authority.

In an alternative embodiment, instead of using a centralized ACL, the restricted class information (e.g., one or more RRC IDs) is stored in an attribute or metadata associated with each of the restricted resources, for example, in a distributed manner. In one embodiment, when an application requests accessing a particular resource, the access control system examines the metadata or attribute of the requested resource in view of the entitlement of the application to determine whether the application is entitled to access that resource. For example, if the entitlement of the application indicates the application is entitled to access a particular class of resources that matches at least one of the one or more restricted resource classes (represented by one or more RRC IDs) associated with the requested resource, the application is allowed to access the requested resource; otherwise, the request is denied.

According to another embodiment, in some situations, although a first application does not have the necessary entitlements to access or attach to or control a second application, the second application may be willing to provide an exception to allow the first application to access resource of the second application or to attach to or control the second application. In one embodiment, when a first application requests to access a second application, the access control system examines the entitlements of the first application against an ACL to determine whether the first application is entitled to access the second application. If it is determined that the first application is not entitled to access the second application, the access control system examines the entitlement of the second application to determine whether the second application specifically allows the first application for accessing the second application as an exception. If the second application specifically allows the first application for accessing, the first application is then allowed to access the second application.

FIG. 1 is a block diagram illustrating an example of access control system of an operating system according to one embodiment of the invention. Referring to FIG. 1, system 100 represents any kind of data processing systems, such as, for example, a server, a desktop, a laptop, a tablet, or a mobile phone, etc. System 100 includes security manager 101 for managing security configuration for a variety of clients, such as application 102, executed within system 100 by processing resources (not shown). System 100 further includes access control manager 103 to managing access of certain resources such as resources 104 of a data processing system. Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Security manager 101 and access control manager 103 may be a part of an operating system (OS) running and executed by the processing resources within system 100. An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition to security manager 101, an operating system may further include other core components, such as a scheduler, a device manager, a kernel, etc. In order not to unnecessarily obscure embodiments of the present invention, these components are not shown herein. The operating system of system 100 may be any kind of operating systems, such as, for example, iOS™ from Apple®, Android™ from Google®, Windows™ from Microsoft®, or other operating systems (e.g., UNIX, LINUX, real-time or embedded operating systems).

According to one embodiment, access control manager 103 maintains an access control list (ACL) 105 listing resources that have been categorized as restricted resources. ACL 105 may be used by access control manager 103 to determine whether a particular resource being accessed is a restricted resource, and if so, whether an application or process attempting to access the resource is entitled to access that particular resource. In one embodiment, ACL 105 includes multiple entries, each corresponding to one of the restricted resources. Each entry includes a resource identifier (e.g., resource ID 111) uniquely identifying a corresponding resource within the data processing system 100 and a restricted resource class identifier (e.g., RRC ID 112) uniquely identifying a class or type of resources in which the corresponding resource is a member. Examples of classes of resources may include a restricted storage class, a restricted block device class, etc. Note that some entries may be associated with the same restricted class of resources (e.g., same RRC identifier), while others may be associated with different restricted classes of resources (e.g., different RRC identifiers).

When access control manager 103 receives a request from application 102 for accessing resource 104, based on the request resource, which may be identified by a resource identifier (e.g., name and/or path), access control manager 103 looks up in ACL 105 searching for an entry having a resource ID matching the one of requested resource 104. If there is no matching entry found, requested resource 104 is not a restricted resource and application 102 is allowed to access requested resource 104.

If a matching entry of ACL 105 is found, according to one embodiment, access control manager 103 obtains a first RRC identifier (e.g., RRC ID 112) from the matching entry, which identifies a restricted class of resources the requested resource 104 belongs. In addition, access control manager 103 determines entitlement 110 of application 102, which may be encoded within an executable image or binary of application. Entitlement 110 may be authorized and signed by a predetermined authority, such as Apple Inc, for example, when application 102 was developed and released to the market or an application store. From entitlement 110 of application 102, access control manager 103 obtains a second RRC identifier. Access control manager 103 then compares the first and second RRC identifiers. If the first and second RRC identifiers are matched, it means application 102 is entitled to access requested resource 104, and access control manager 103 grants a permission to allow application 102 to access resource 104.

In the example as shown in FIG. 1, it is assumed application 102 requests to access a particular resource, in this example, a storage location "/system/lib/abc/*." In response to the request, access control manager 103 looks up in ACL 105 based on "/system/lib/abc/*" as a search key to locate entry 106 having a resource ID matching "/system/lib/abc/*" and from entry 106, access control manager 103 obtains RRC identifier of "system framework." Such an entry indicates that resource "/system/lib/abc/*" is associated with a restricted class of "system framework."

In addition, access control manager 103 obtains an RRC identifier based on entitlement 110 of application 102. Access control manager 103 compares the RRC identifier of application 102 against RRC identifier "system framework." In this example, assuming the RRC identifier of application 102 matches "system framework," access control manager 103 then allows application 102 to access resource "/system/lib/abc/*." Note that since the RRC identifier of application 102 is "system framework," application 102 may also access other restricted resources listed in ACL 105 that are associated with a restricted resource class of "system framework." As a result, even if application 102 is a malware or hijacked by a malware having the highest accessing privilege level (e.g., root or administrative privilege), if application 102 does not possess the necessary and authenticated RRC identifier, it cannot access the corresponding restricted resource.

In the example as shown in FIG. 1, the system centrally maintains ACL 105 for most or all of the restricted sources. According to another embodiment, the information of ACL 105 may be maintained in a distributed manner. An RRC identifier associated with a restricted resource may be stored in an attribute or metadata associated with the corresponding restricted resource. Thus, when access control manager 103 determines whether a particular resource is a restricted resource and if so, which restricted class associated with it, access control manager 103 can examines the attributes or metadata of the resource, instead of a centralized ACL.

Figure 2:
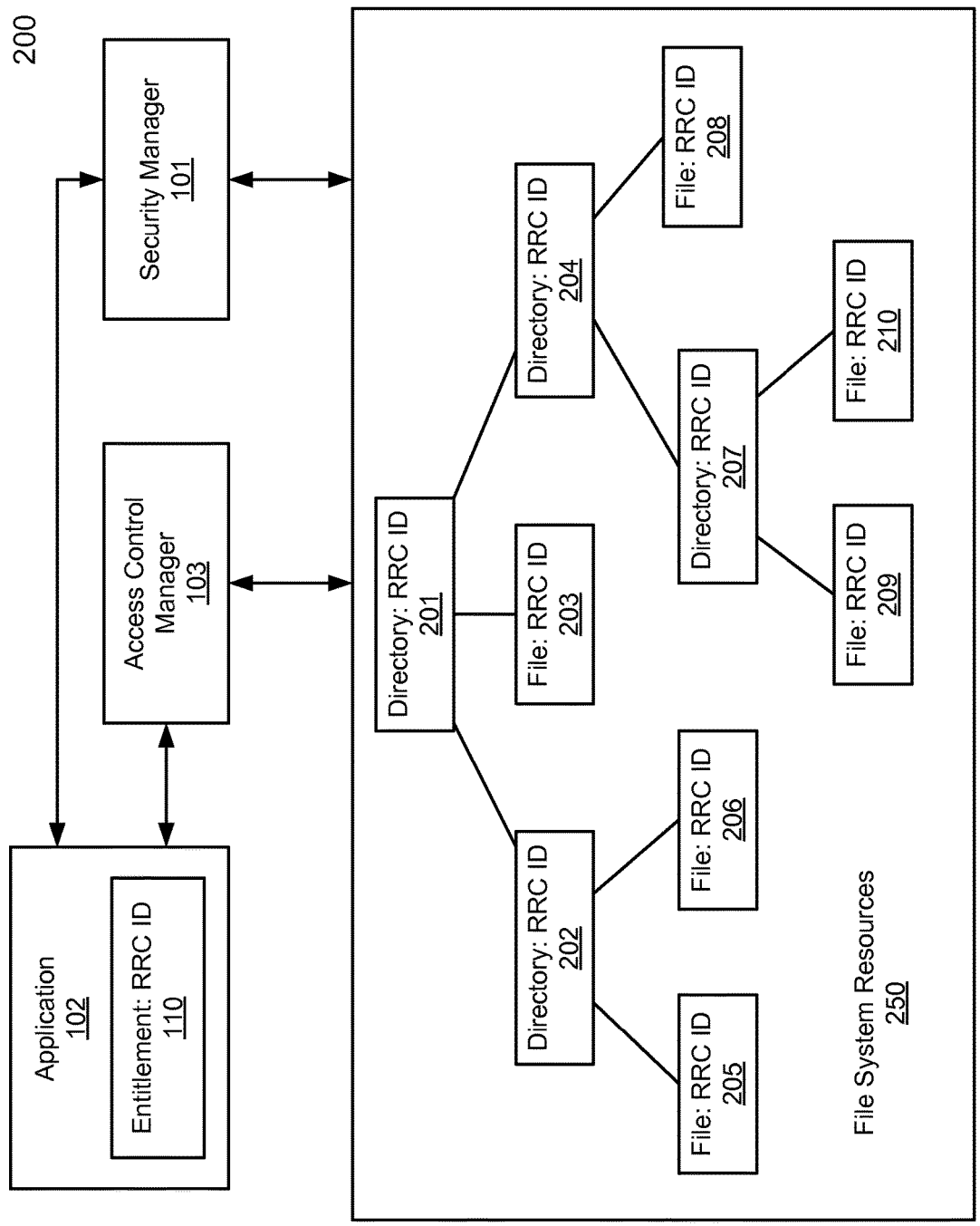
FIG. 2 is a block diagram illustrating an access control system of a data processing system according to another embodiment of the invention.

FIG. 2 is a block diagram illustrating an access control system of a data processing system according to another embodiment of the invention. System 200 may be implemented as part of system 100 of FIG. 1. Referring to FIG. 2, in this example, it is assumed application 102 attempts to access a resource as part of file system resources 250, although the techniques described herein can be applied to other types of resources. In this example, file system resources 250 include various nodes 201-210, each representing a file or a directory in a hierarchical structure. As the nature of a file system, each file or directory has its own attributes or metadata associated with it, such as an inode. An inode is used to represent a file system object, which can be one of various things including a file or a directory. Each inode stores the attributes and disk block location(s) of the file system object's data. File system object attributes may include manipulation metadata (e.g. change, access, modify time), as well as owner and permission data (e.g. group identifier, user identifier, permissions).

In one embodiment, if a file system object, in this example either a file or directory, is categorized as a restricted resource, an attribute or metadata of the file system object includes a list of one or more RRC identifiers identifying one or more classes or types of resources that the file system object belongs. The RRC information may be stored in the regular file system attributes or alternatively, as part of extended file system attributes or simply extended file attributes. The extended file attribute is a file system feature that enables users to associate computer files with metadata not interpreted by the file system, whereas regular attributes have a purpose strictly defined by the file system (such as permissions or records of creation and modification times). Uses can store the author of a document, the character encoding of a plain-text document, a checksum, cryptographic hash or digital signature.

Referring back to FIG. 2, some of the file system resources 201-210 may be associated with the same RRC class or different RRC classes. A resource may be associated with multiple classes of resources. The information stored in the attributes of the file system resources 250 may be securely maintained by security manager 101. Any attempt to modify the security settings of these attributes may be vigorously examined and authenticated by security manager, which may require an authenticated user physically present to reduce the probability of malware attack. However, an installer that is part of an operating system may have the privilege to create, modify, or delete certain security settings, as long as the installer is cannot be attacked or compromised. For example, when a new application of a particular user is installed in the system, the installer should be able to create a home directory for the new application and configure any necessary security settings for the new application. Similarly, when a currently installed application is being uninstalled, the installer/uninstaller should be able to remove the corresponding security settings.

In one embodiment, when access control manager 103 receives a request from application 102 for accessing a file system resource, in this example, file object 203, access control manager 103 examines and retrieves a first RRC identifier from an attribute of file object 203. Access control manager 103 compares the first RRC identifier with a second RRC identifier retrieved from entitlement 110 of application 102. If the first and second RRC identifiers are matched, access control manager 103 allows application 102 to access file object 203; otherwise, the request is denied. The RRC identifiers stored in the metadata of the resources are collectively referred to as a distributed ACL. In this embodiment, there is no need to maintain a centralized ACL such as ACL 105 of FIG. 1, although in certain implementations, both a distributed ACL and a centralized ACLs may be maintained.

Figure 3:
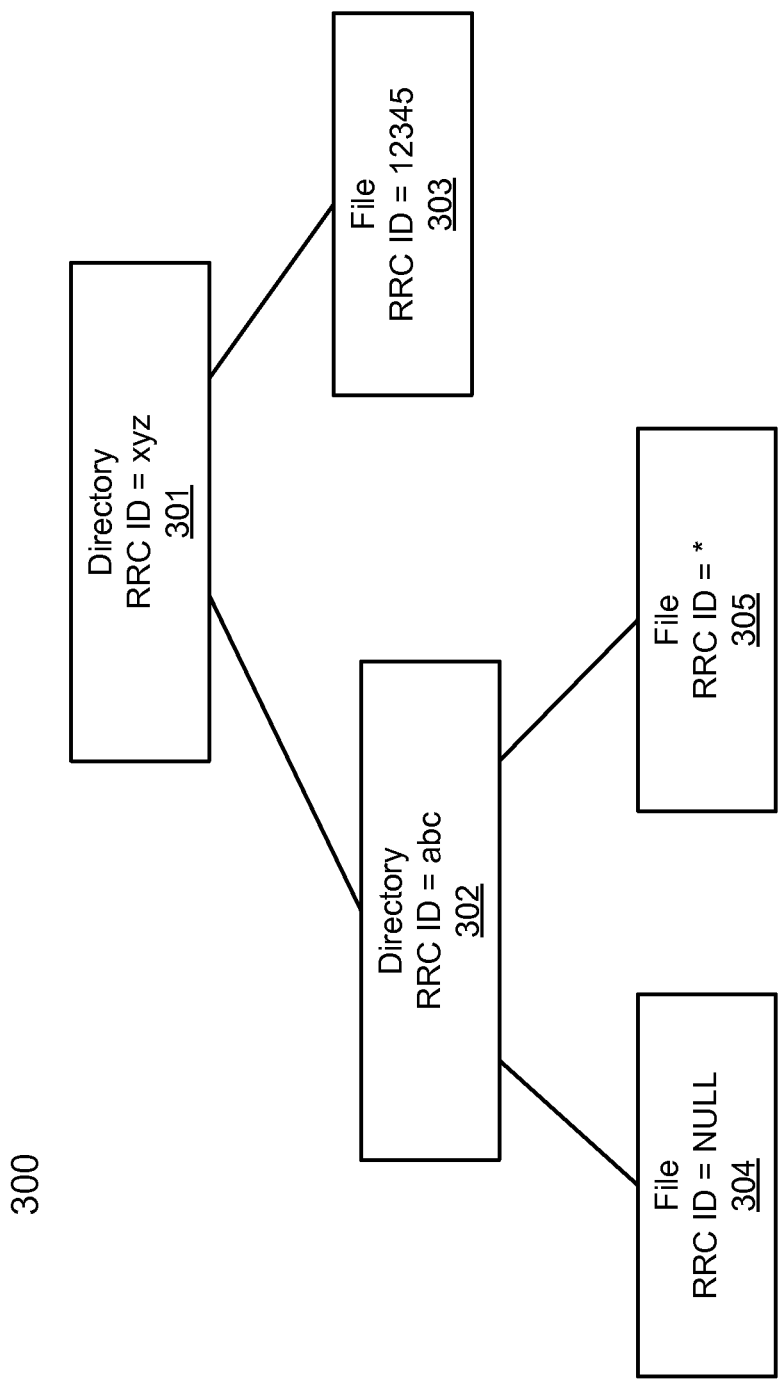
FIG. 3 is a block diagram illustrating an access control system of a data processing system according to another embodiment of the invention.

Note that not all of the resources are restricted resources and the unrestricted resources are accessible by anybody. Some resources, although not specified, may be considered as restricted resources based on their relationship with another restricted resource. FIG. 3 is a block diagram illustrating an access control system of an operating system according to another embodiment of the invention. Referring to FIG. 3, in this example, resources 301-305 have stored in their respective metadata or attributes RRC identifiers "xyz," "abc," "12345," "NULL," and "*," respectively, which will be described in details further below.

In one embodiment, when the access control manager (e.g., access control manager 103 of FIG. 2) examines a security settings of a particular resource, the access control manager may traverse the hierarchical tree 300 (which may be part of file system resources 250 of FIG. 2) in a bottom up approach. For example, when an application requests accessing resource 304, since in this example, there is no RRC identifier (e.g., RRC identifier is NULL) specified in an attribute of resource 304, typically it means that everybody can access resource 304 without restriction. However, since resource 304 is a child resource of another resource (e.g., resource 302 as a parent resource), it may inherit certain security settings of its parent(s). In one embodiment, the access control manager traverse the tree to examine parent resource 302 to determine whether parent resource 302 is a restricted resource. Since parent resource 302 is a restricted resource that requires an RRC identifier of "abc," child resource 304 then inherits the same security settings from resource 302 and requires only the application that has the RRC identifier of "abc" can access resource 304.

According to another embodiment, in some situations, although a particular resource is a child resource of another parent resource, one can specify in its attribute an exception to the security settings of its parent resource(s). Referring to FIG. 3, resource 305 is a child resource of resource 302. However, in this example, child resource 305 have an RRC identifier as a predetermined token, value, a string of characters, or a combination thereof, such as "*." For the purpose of illustration, such a RRC identifier of "*" means that resource 305 does not inherit the security settings from its parent 302. Rather, it means a security settings other than its parent's security settings, in this example, it would allow everybody to access resource 305 as an exception.

Figure 4:
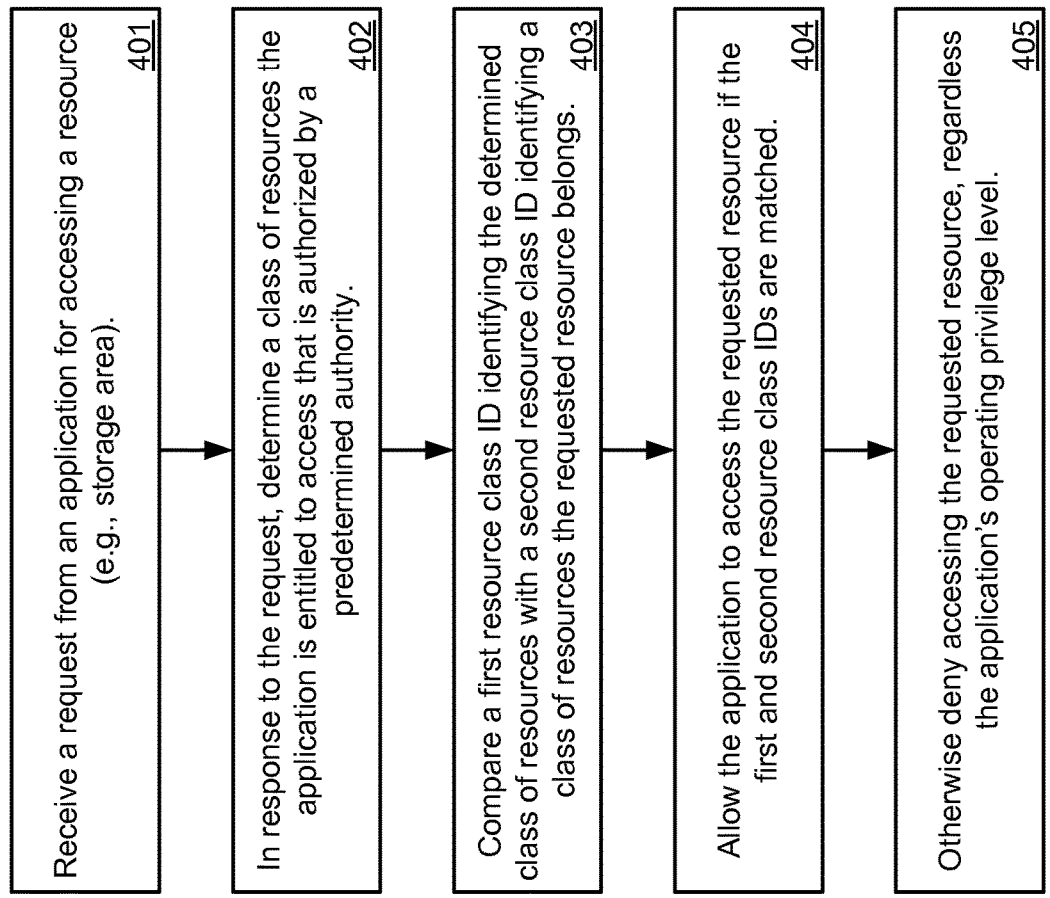
FIG. 4 is a flow diagram illustrating a method for controlling access of resources of an operating system according to one embodiment of the invention.

FIG. 4 is a flow diagram illustrating a method for controlling access of resources of an operating system according to one embodiment of the invention. Method 400 may be performed by processing logic which may include software, hardware, or a combination thereof. For example, method 400 may be performed by systems 100 and/or 200 of FIGS. 1-2. Referring to FIG. 4, at block 401, processing logic receives a request from an application for accessing a resource (e.g., a file or directory of a file system). In response to the request, at block 402, processing logic determines a class or type of resources the application is entitled to access, which is authorized (and signed) by a predetermined authority. At block 403, processing logic compares a first resource class identifier identifying the determined class of resources with a second resource class identifier identifying a class of resources the requested resource belongs. At block 404, if the first and second resource class identifiers are matched, the application is allowed to access the requested resource and otherwise, at block 405, the request is denied.

Figure 5:
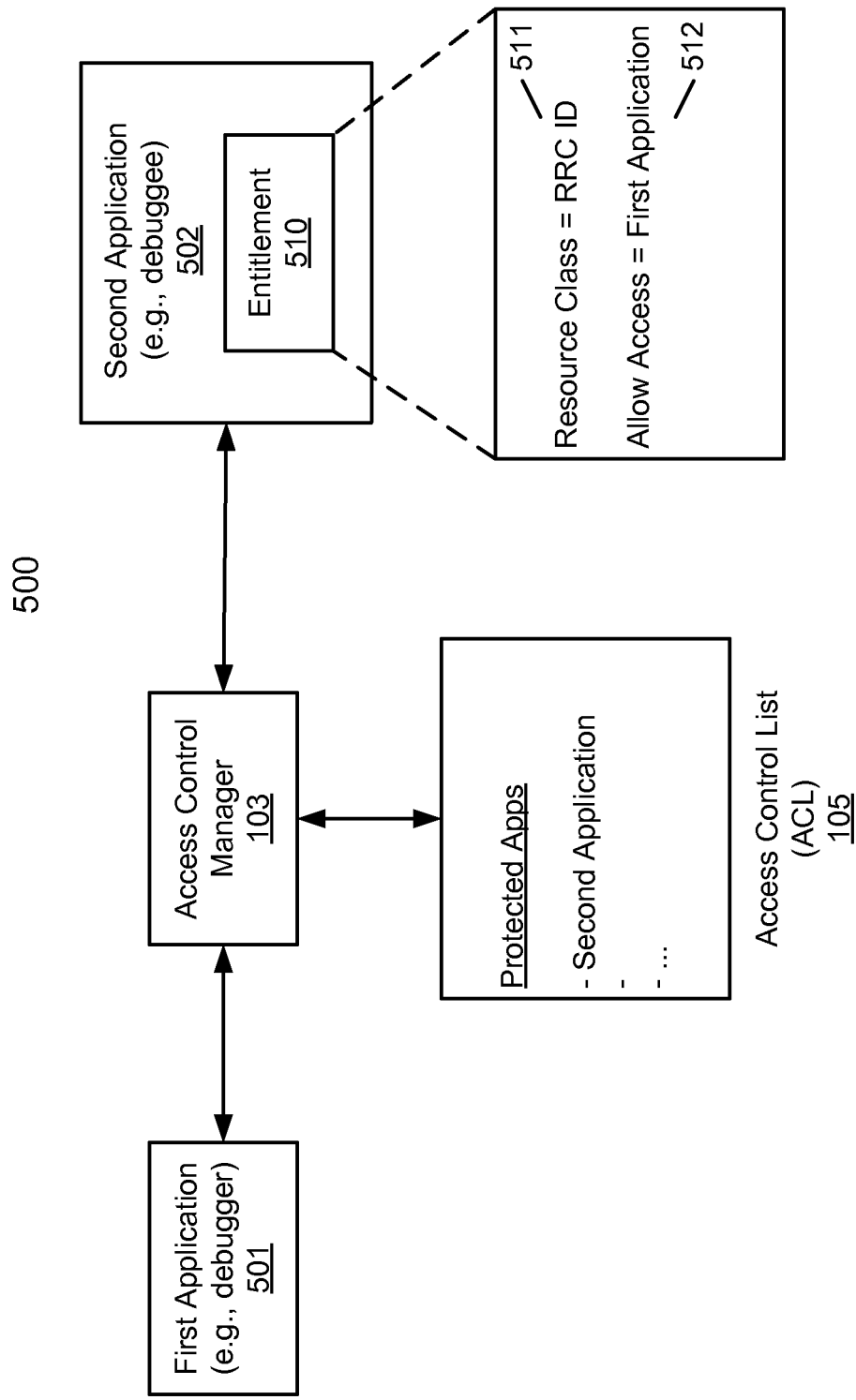
FIG. 5 is a block diagram illustrating an access control system of a data processing system according to another embodiment of the invention.

The techniques described above can also be applied in a situation in which an application may request attaching to another application for the purpose of controlling at least a portion of operations of the other application (e.g., debugging purpose). FIG. 5 is a block diagram illustrating an access control system according to another embodiment of the invention. System 500 may be implemented as a part of or in addition to systems 100 and/or 200 of FIGS. 1-2.

Referring to FIG. 5, ACL 105 is configured to store information indicating whether a particular application can be attached by another application, for example, as a particular protected class of applications for the purpose of being attached by another application. Alternatively, by default each application is not attachable. In addition, each application can also have an option to opt out of the default option of being attachable.

In one embodiment, in this example, application 502 may specify in its entitlement 510 (e.g., entitlement 512) to specifically allow a particular application (in this example, application 501, to attach or control application 502. Entitlement 510 may further specify RRC identifier 511 as described above. When access control manager 103 receives a request from application 501 for attaching to application 502, access control manager 103 may examine ACL 105 to determine whether application 502 is a protected class of application that would not allow anybody to attach. Dependent upon the system configuration, if by default all applications will not allow attachment, access control manager 103 may not have to examine ACL 105.

If it is determined that application 502 is a part of a protected class of resources, access control manager 103 examines entitlement 510 of application 502 to determine whether there is exception that application 502 provides. Again, entitlement 510 is encoded within an executable code of application 502, authorized and signed by a proper authority, such that an attacker is not able to modify it. If entitlement 510 specifies that application 501 is allowed for attachment, for example, by matching application identifier 512 with an application identifier of application 501. If entitlement 510 indicates application 501 to attach to application 502, access control manager 103 allows application 501 hook up with application 502.

The above techniques can be utilized by a software developer during software development of application 502 as a debuggee, where application 501 is a debugger. A software developer can temporarily open an exception by specifying in entitlement 510 of debuggee 502 that debugger 501 is allowed to access and/or control debuggee 502. In response to such an exception, access control manager 103 allows debugger 501 to access and/or control debuggee 502. Thereafter, the developer can remove entitlement 512 from entitlement 510 prior to releasing application 502, such that the released version of application 502 will not allow anybody to attach. With the security measure as shown in FIG. 5, even a malware having a highest access privilege (e.g., root or administrative) cannot attach or control another application.

Figure 6:
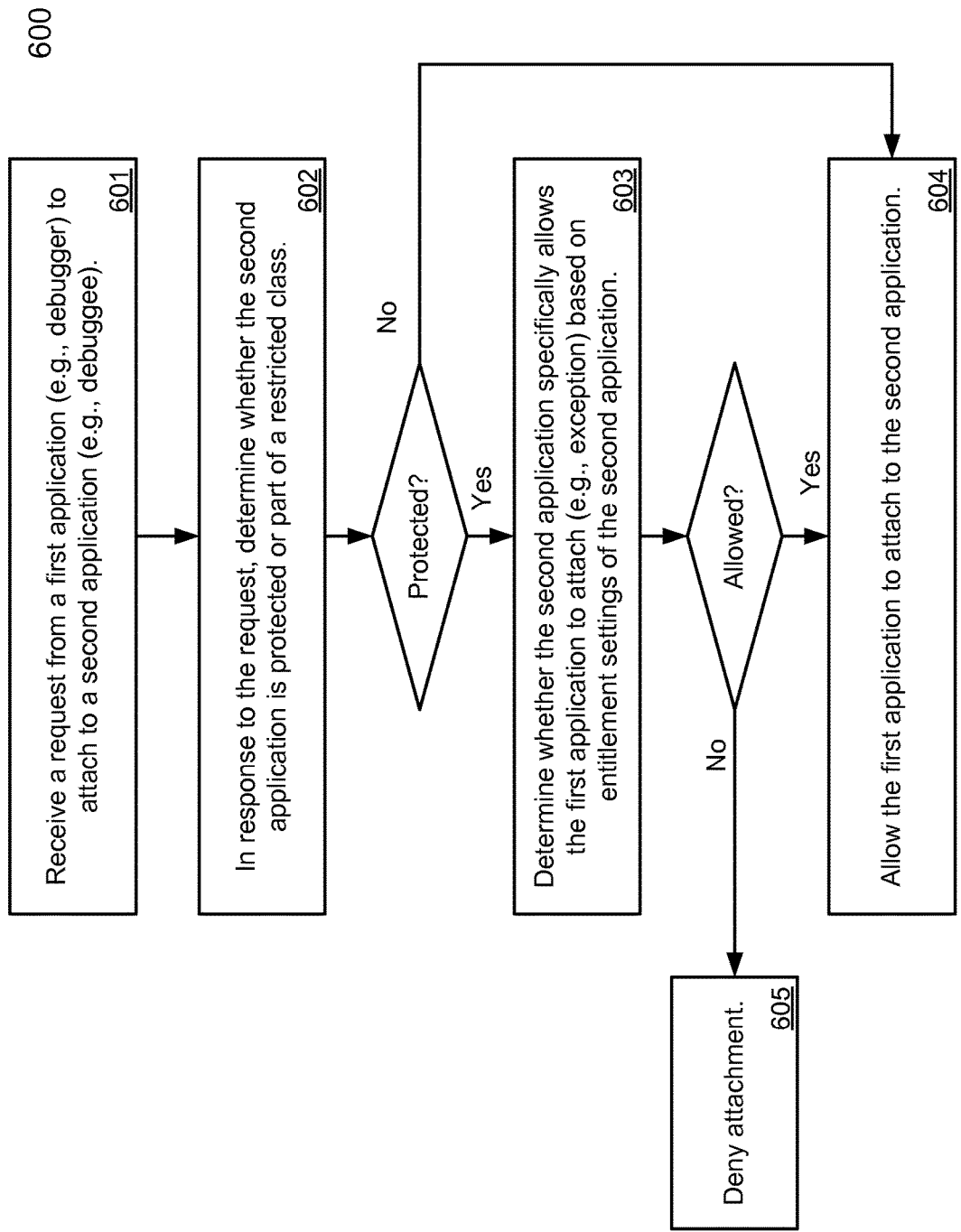
FIG. 6 is a flow diagram illustrating a method for controlling access of resources of an operating system according to another embodiment of the invention.

FIG. 6 is a flow diagram illustrating a method for access control of an operating system according to another embodiment of the invention. Method 600 may be performed by processing logic which may include software, hardware, or a combination thereof. For example, method 600 may be performed by system 500 of FIG. 5. Referring to FIG. 6, at block 601, processing logic receives a request from a first application (e.g., debugger) to attach to a second application (e.g., debuggee). In response to the request, at block 602, processing logic determines whether the second application is protected or as part of a restricted class of resources. If not, the first application may be allowed to attach to the second application at block 604. If it is determined the second application is part of protected class, at block 603, processing logic determines whether the second application specifically allows the first application to attach (e.g., exception) based on the entitlement of the second application. If so, the first application is allowed to attach to the second application at block 604; otherwise, the request is denied at block 605.

Figure 7:
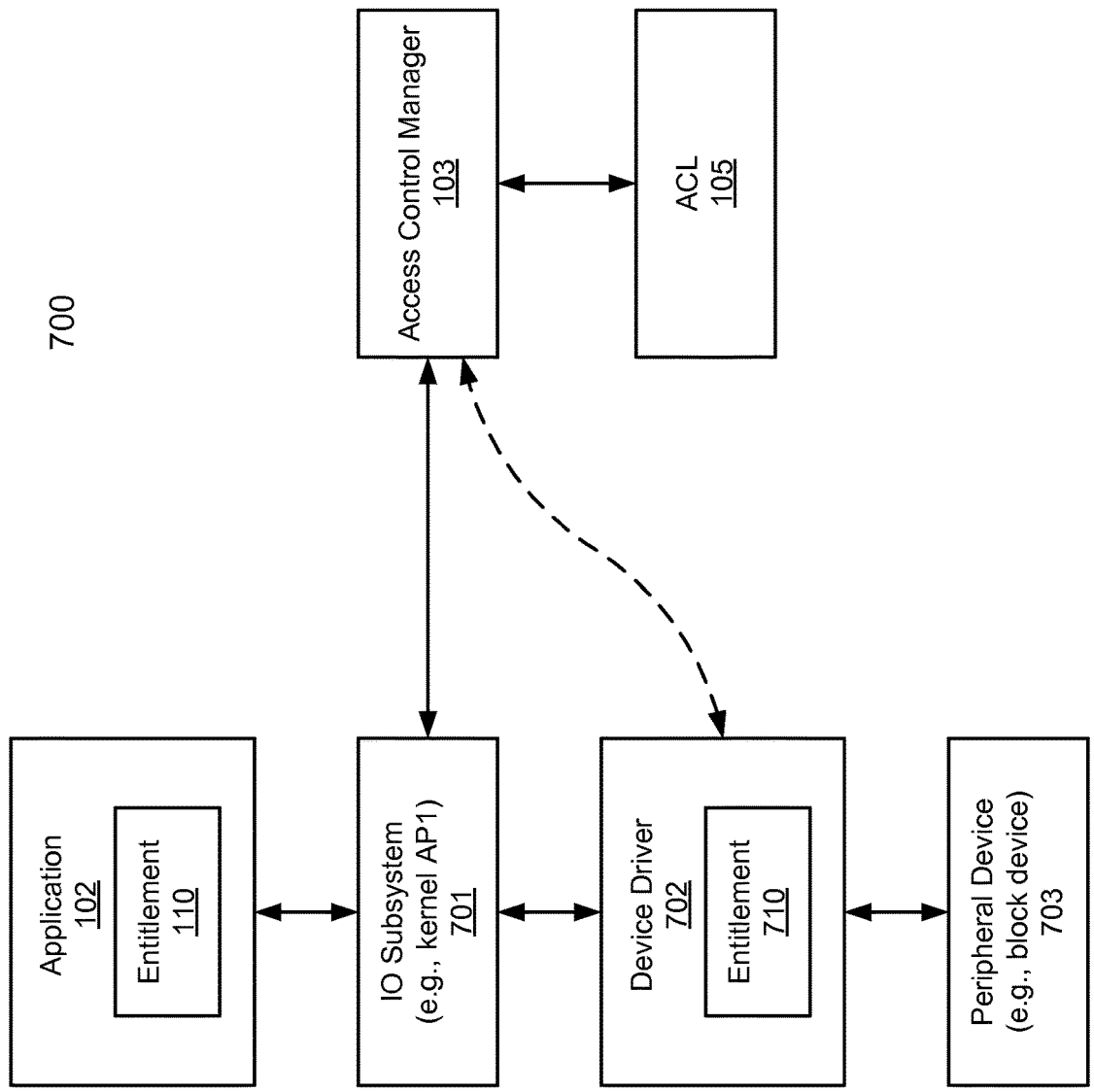
FIG. 7 is a block diagram illustrating an access control system of a data processing system according to another embodiment of the invention.

According to some embodiments, the techniques described above can be applied to controlling access of not only software components but also hardware components of a data processing system, or a combination of software and hardware components. FIG. 7 is a block diagram illustrating an access control system of a data processing system according to another embodiment of the invention. System 700 may be implemented in conjunction with any of the systems described above. Referring to FIG. 7, a hardware component, in this example, peripheral device 703 can be categorized as a restricted resource of a particular class (e.g., block device class). As described above, an installer or an administrator of system 700 may have configured in ACL 105 to designate hardware device 703 is a restricted hardware resource that requires a particular RRC identifier in order to access. Alternatively, such an RRC identifier may be embedded or encoded as part of entitlement 710 within corresponding device driver 702, where entitlement 710 may be authorized and signed by a proper authority.

In one embodiment, when access control manager 103 receives a request from application 102 for accessing a system component (e.g., kernel component and/or hardware resource), access control manager 103 examines whether application 102 is entitled to access the requested system component, for example, using some or all of the access control techniques described above. If it is determined application 102 is entitled to access the requested system component, it will be allowed to access the requested system component; otherwise, the request will be denied.

In this example as shown in FIG. 7, when IO subsystem (e.g., kernel API) 701 and/or device driver 702 receive a request from application 102 for accessing peripheral device 703, access control manager 103 is invoked to examines to determine whether application is entitled to access device driver 702 and/or peripheral device 703, for example, based on entitlement 110 of application 102 and ACL 105 and/or entitlement 710 of device driver 702 as described above. If it is determined application 102 is entitled to access device driver 702 and/or peripheral device 703, it will be allowed to access the requested software and/or hardware resources; otherwise, the request will be denied. According to a further embodiment, the techniques described throughout this application can also be applied to prevent an unauthorized kernel extension to be loaded and executed within a kernel of an operating system.

Figure 8:
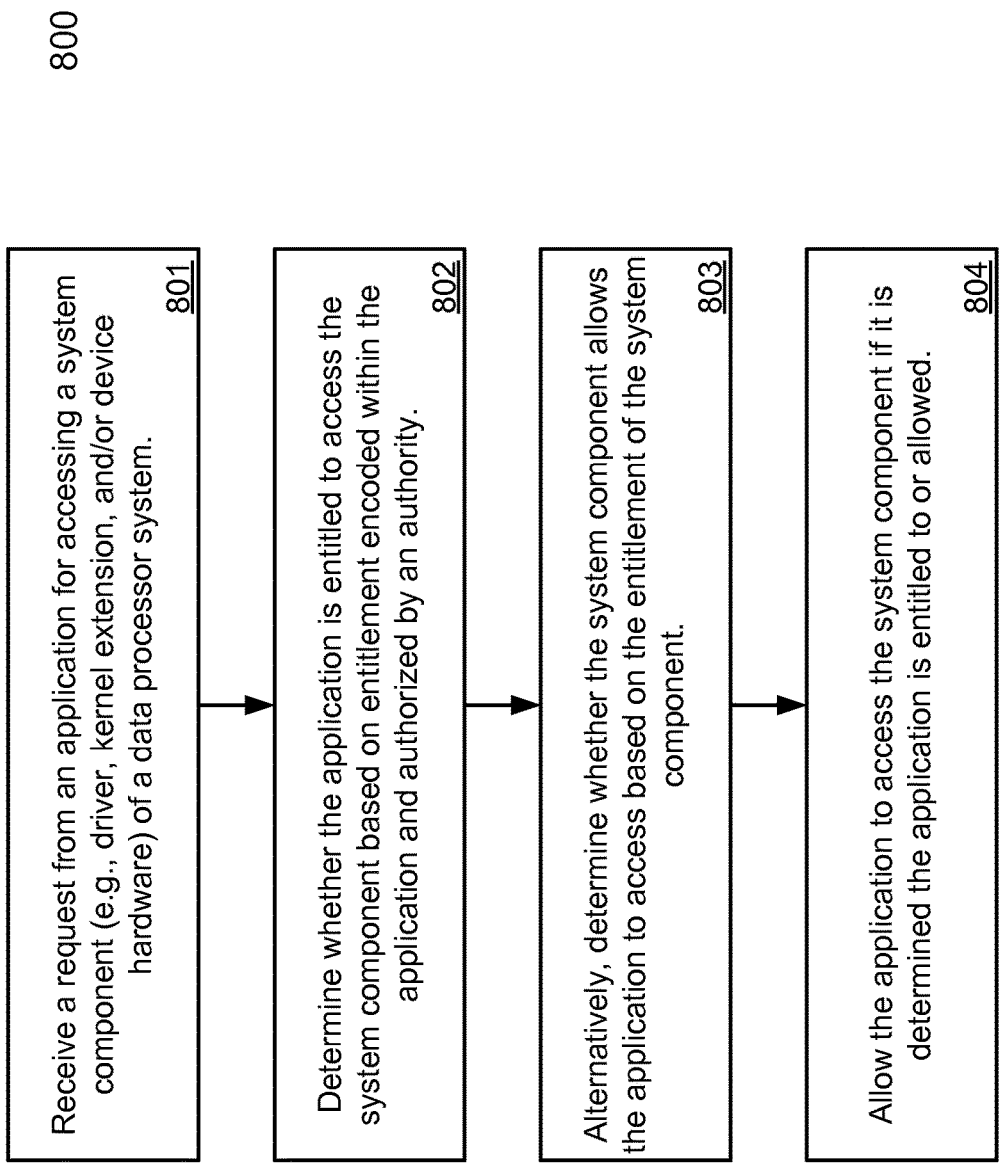
FIG. 8 is a flow diagram illustrating a method for controlling access of resources of an operating system according to another embodiment of the invention.

FIG. 8 is a flow diagram illustrating a method for access control of an operating system according to another embodiment of the invention. Method 800 may be performed by processing logic which may include software, hardware, or a combination thereof. For example, method 800 may be performed by system 700 of FIG. 7. Referring to FIG. 8, at block 801, processing logic receives a request from an application for accessing a system component (e.g., kernel component or kernel extension, device driver, and/or hardware device) of a data processing system. In response to the request, at block 802, processing logic determine whether the application is entitled to access the requested system component based on the entitlement of the application or alternatively, processing logic determines whether the system component specifically allows the application for access at block 803. If it is determined the application is entitled or allowed to access the system component, at block 804, a permission is granted to the request; otherwise, the request is denied.

According to some embodiment, the security settings concerning the restricted classes of resources may be securely managed and only an authorized process can be allowed to create, modify, and/or delete a security settings. In order to avoid a malware who illegally gains certain accessing privileges (e.g., root, administrative) to modify the security settings, a security manager (e.g., security manager 101 of FIG. 1) may prove that a request for modifying a security settings is initiated from a user physically. The security system of a data processing system may cause a user to perform a physical act that only a human can do that before allowing the security settings to be modified.

Figure 9:
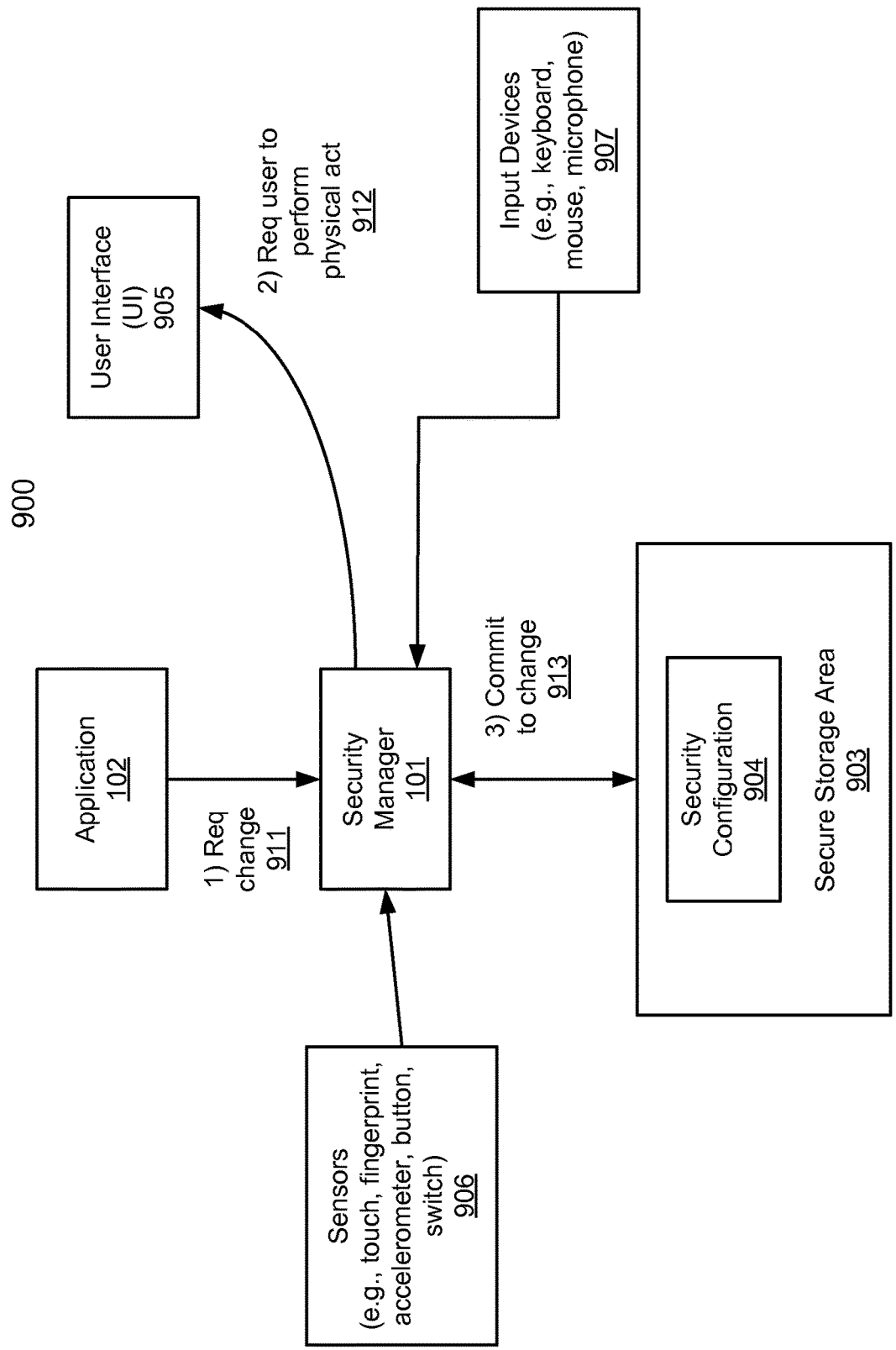
FIG. 9 is a flow diagram illustrating a method for controlling access of resources of an operating system according to another embodiment of the invention.

FIG. 9 is a block diagram illustrating a security system architecture of a data processing system according to one embodiment of the invention. Referring to FIG. 9, system 900 includes security manager 101 for managing security configuration 904 for a variety of clients, such as application 102, executed within system 900. Security manager 101 may be a part of an operating system.

According to one embodiment, when an application 102 attempts to modify security settings or configuration 904 (e.g., restricted resource class information), it sends a request for modifying a security settings via path 911 to security manager 101. In this example, application 102 may or may not be malware, application 102 may any of applications currently installed in the operating system. Alternatively, application 102 may be a malware or an application that has been infected or hijacked by malware. Security configuration 904 may be the security configuration of application 102 itself, a security settings of another application, and/or a security settings of a system component, such as an operating system component or hardware component of the data processing system.

Typically, security settings 904 is protected and stored in a secure storage location or area of a persistent storage device or remote server via a secure connection of the data processing system. For example, security settings 904 may be protected using a variety of encryption techniques and stored in a hidden storage area of a storage device that only the corresponding application 102 or the kernel of the operating system would know. A request for modifying a security settings of application 102 (e.g., browser) may be to give a permission to allow another application to access data associated with application 102 (e.g., browser history). In another example, application 102 may be an email or contact application and a request for modifying the security settings is to permitting another application (e.g., social media application) to access the contacts or email history of application 102. If malware gains a certain accessing privilege level such as a root or administrative privilege level, it can gain control of application 102 or impersonate application 102 to modify the security settings 904 to access the privileged data of the application. Similarly, malware can also modify the security settings of the operating system to take over the control of the operating system.

According to one embodiment, in response to the request for modifying security settings 904 received via path 911, security manager 101 requests via path 912 and user interface 905 a user who operating the data processing system to perform a physical act that only a human can perform. In one embodiment, security manager 101 may cause the operating system to reboot and during an early stage of the reboot, a message having a secret code is displayed on user interface to prompt the user to memorize the secret code being displayed and to attempt to modify the security settings again after the reboot has completed. For example, the message can be displayed prior to the kernel of the operating system has been completely loaded and before any of the user level applications or third-party kernel components (e.g., device drivers) are loaded. Subsequently after the operating system has been completed loaded, the user should make a second attempt to modify the security settings and the system will prompt the user to reenter the secret code the user obtained during the reboot. If the reentered secret code is verified, the user is allowed to modify security settings 904 via path 913.

According to another embodiment, instead of rebooting the system, a string of characters and/or codes (e.g., letters, characters, numbers, or a combination thereof) may be displayed in a CAPTCHA (Completely Automated Public Turing test to tell Computers and Human beings Apart) form that only a human can recognize it. The system prompts the user to reenter the string in the CAPTCHA form in a predetermined input field. If the reentered string is verified, the user is allowed to modify the security settings. Note that the above described scenarios are describe for illustration purpose only; other physical acts may also be utilized. For example, security manager 101 may request the user to press a particular button, flip a particular switch, touch a particular area of a touch screen or fingerprint reader, physically move the data processing system, in this example, a mobile device, in a particular direction, or a combination thereof.

These physical acts can be detected by a variety of corresponding sensors 906. Alternatively, security manager 101 may request the user to press a particular keystroke on a keyboard, click a particular button of a mouse, speak to a microphone a particular phrase, or a combination thereof, which may be detected by one or more input devices 907. Furthermore, security manager 101 may display a message via user interface to prompt the user to launch a particular application and perform a particular action within that application, etc. A combination of at least some of the above actions can be performed to prove or verify that the user is physically present to initiate the request for modifying the security settings. Such actions are unlikely performed or impersonated by malware.

Figure 10:
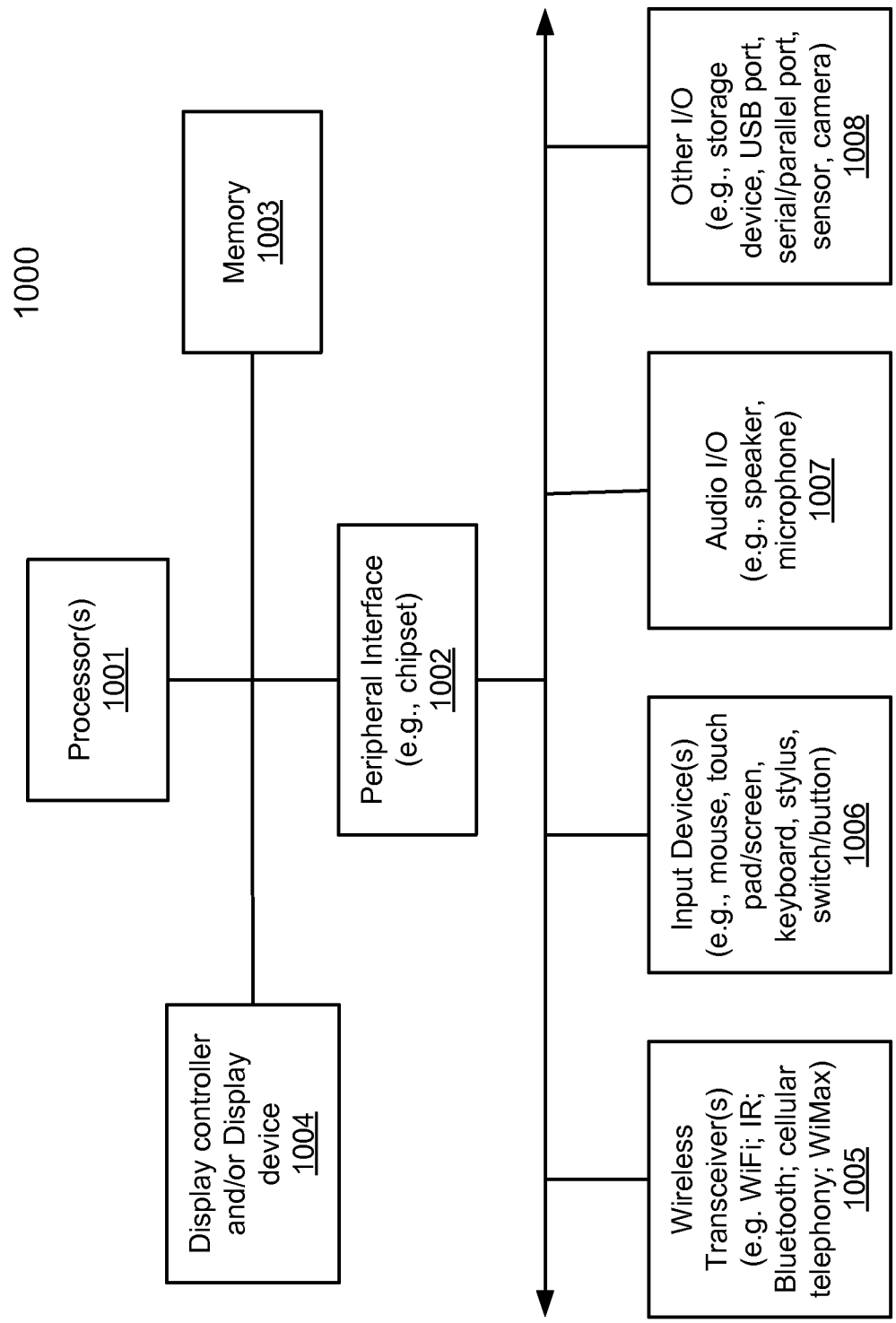
FIG. 10 is a block diagram illustrating an example of a data processing system which may be used with one embodiment of the invention.

FIG. 10 is a block diagram illustrating an example of a data processing system which may be used with one embodiment of the invention. For example, system 1000 may represents any of data processing systems described above performing any of the processes or methods described above. For example, system 1000 may represent systems as shown in FIGS. 1-2, 5, and 7 as described above. System 1000 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 10, in one embodiment, system 1000 includes processor 1001 and peripheral interface 1002, also referred to herein as a chipset, to couple various components to processor 1001 including memory 1003 and devices 1005-1008 via a bus or an interconnect. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1001 is configured to execute instructions for performing the operations and steps discussed herein.

Peripheral interface 1002 may include memory control hub (MCH) and input output control hub (ICH). Peripheral interface 1002 may include a memory controller (not shown) that communicates with a memory 1003. Peripheral interface 1002 may also include a graphics interface that communicates with graphics subsystem 1004, which may include a display controller and/or a display device. Peripheral interface 1002 may communicate with graphics device 1004 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 1001. In such a configuration, peripheral interface 1002 operates as an interface chip performing some functions of the MCH and ICH. Furthermore, a graphics accelerator may be integrated within the MCH or processor 1001.

Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 1002 may provide an interface to IO devices such as devices 1005-1008, including wireless transceiver(s) 1005, input device(s) 1006, audio IO device(s) 1007, and other IO devices 1008. Wireless transceiver 1005 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 1007 may include a speaker and/or a microphone to facilitate voice-enabled functions, such as voice recognition, voice replication, digital recording, and/or telephony functions. Other optional devices 1008 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 1008 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 10 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving, by an access control manager, from an application, one or more entitlements encoded in the application, the entitlements including one or more restricted resource class (RRC) identifiers, wherein a restricted resource class identifier represents a class of a plurality of restricted resources and the application is entitled to access any of the plurality of restricted resources in the RRC having the RRC identifier;
receiving, by the access control manager, a request from the application for accessing a resource of a data processing system, the resource having a resource identifier;
determining, by the access control manager, whether the resource identifier is in an access control list that contains a plurality of resource identifiers wherein each resource identifier is associated with an RRC identifier, indicating that the resource is a restricted resource;
in response to determining that the resource is in the access control list and is a restricted resource:
determining, by the access control manager, from the access control list, a first RRC identifier associated with the resource identifier of the restricted resource;
determining, by the access control manager, whether the first RRC identifier matches a second RRC identifier that is in the entitlements received from the application;
allowing, by the access control manager, the application to access the resource if the first RRC identifier matches the second RRC identifier that is in the entitlements received from the application; and
denying, by the access control manager, the application from accessing the resource if the first RRC identifier is not found in the entitlements received from the application, regardless of an operating privilege level of the application.

2. The method of claim 1, wherein determining the first class of resources the requested resource belongs comprises:
accessing an access control list (ACL) to locate an entry associated with the requested resource; and
obtaining the first restricted resource class (RRC) identifier from the entry, the first RRC identifier identifying the first class of resources in which the requested resource is a member.

3. The method of claim 2, wherein determining the second class of resources the application is entitled comprises obtaining the second RRC identifier from the resource entitlement of the application, and wherein the application is allowed to access the requested resource if the first and second RRC identifiers are matched.

4. The method of claim 2, wherein the ACL is centrally maintained by a security manager of the operating system.

5. The method of claim 1, wherein determining the first class of resources the requested resource belongs comprises:
   accessing metadata of the requested resource that is stored as part of one or more attributes of the requested resource; and
   obtaining the first restricted resource class (RRC) identifier from the metadata, the first RRC identifier identifying the first class of resources in which the requested resource is a member.

6. The method of claim 1 further comprising: in response to determining that the first RRC identifier matches the second RRC identifier that is in the application entitlements, allowing the application to access other restricted resources in the plurality of restricted resources associated with the first RRC identifier.

7. The method of claim 5, further comprising:
   traversing a hierarchical tree of resources, the requested resource comprising a child resource of a parent resource in the hierarchical tree of resources;
   determining whether the first RRC identifier matches a predetermined RRC identifier that indicates that the resource does not inherit security settings from a parent resource of the resource in the first RRC; and
   allowing the application to access the resource even if the first RRC identifier is not found in the resource entitlements received from the application.

8. The method of claim 1, wherein the requested resource is a file system resource of the data processing system representing at least one of a file and a directory of one or more files.

9. The method of claim 1, wherein the requested resource is a device driver of a peripheral device of the data processing system.

10. The method of claim 1, wherein the requested resource is attaching to a second application or controlling the second application.

11. A non-transitory machine-readable medium having instructions stored therein, which when executed by a processor, cause the processor to perform a method, the method comprising:
   receiving, by an access control manager, from an application, one or more entitlements encoded in the application, the entitlements including one or more restricted resource class (RRC) identifiers, wherein a restricted resource class identifier represents a class of a plurality of restricted resources and the application is entitled to access any restricted resource in the restricted resource class for which the application has an entitlement with the RRC identifier for the restricted resource class;
   receiving, by the access control manager, a request from the application for accessing a resource of a data processing system, the resource having a resource identifier;
   determining, by the access control manager, whether the resource identifier is in an access control list that contains a plurality of resource identifiers wherein each resource identifier is associated with an RRC identifier, indicating that the resource is a restricted resource;
   in response to determining that the resource is a restricted resource in the access control list and is a restricted resource:
      determining, by the access control manager, from the access control list, a first RRC identifier associated with the resource identifier of the restricted resource;
      determining, by the access control manager, whether the first RRC identifier matches a second RRC identifier that is in the entitlements received from the application;
      allowing, by the access control manager, the application to access the resource if the first RRC identifier matches the second RRC identifier that is in the entitlements received from the application; and
      denying, by the access control manager, the application from accessing the resource if the first RRC identifier is not found in the entitlements received from the application, regardless of an operating privilege level of the application.

12. The non-transitory machine-readable medium of claim 11, wherein determining the first class of resources the requested resource belongs comprises:
   accessing an access control list (ACL) to locate an entry associated with the requested resource; and
   obtaining the first restricted resource class (RRC) identifier from the entry, the first RRC identifier identifying the first class of resources in which the requested resource is a member.

13. The non-transitory machine-readable medium of claim 12, wherein determining the second class of resources the application is entitled comprises obtaining the second RRC identifier from the resource entitlement of the application, and wherein the application is allowed to access the requested resource if the first and second RRC identifiers are matched.

14. The non-transitory machine-readable medium of claim 12, wherein the ACL is centrally maintained by a security manager of the operating system.

15. The non-transitory machine-readable medium of claim 11, wherein determining the first class of resources the requested resource belongs comprises:
   accessing metadata of the requested resource that is stored as part of one or more attributes of the requested resource; and
   obtaining the first restricted resource class (RRC) identifier from the metadata, the first RRC identifier identifying the first class of resources in which the requested resource is a member.

16. The non-transitory machine-readable medium of claim 11, further comprising: in response to determining that the first RRC identifier matches the second RRC identifier that is in the application entitlements, allowing the application to access other restricted resources in the plurality of restricted resources associated with the first RRC identifier.

17. A data processing system, comprising:
   a processor; and
   a memory coupled to the processor for storing instructions, which when executed from the memory, cause the processor to:
      receive, by an access control manager, from an application, one or more entitlements encoded in the application, the entitlements including one or more restricted resource class (RRC) identifiers, wherein a restricted resource class identifier represents a class of a plurality of restricted resources indicating that the application is entitled to access any of the plurality of restricted resources in the restricted resource class for which the application has an entitlement with the RRC identifier for the restricted resource class;

receive, by the access control manager, a request from the application for accessing a resource of a data processing system, the resource having a resource identifier, determine, by the access control manager, whether the resource identifier in an access control list that contains a plurality of resource identifiers wherein each resource identifier is associated with an RRC identifier, indicating that the resource is a restricted resource;

in response to determining that the resource is in the access control list and is a restricted resource:
  determine, by the access control manager, from the access control list, a first RRC identifier associated with the resource identifier of the restricted resource,
  determine, by the access control manager, whether the first RRC identifier matches a second RRC identifier that is in entitlements received from the application,
  allow, by the access control manager, the application to access the resource if the first RRC identifier matches the second RRC identifier that is in the entitlements received from the application, and
  deny, by the access control manager, the application from accessing the resource if the first RRC identifier is not found in the entitlements received from the application, regardless of an operating privilege level of the application.

18. The system of claim 17, wherein determining the first class of resources the requested resource belongs comprises:
  accessing an access control list (ACL) to locate an entry associated with the requested resource; and
  obtaining the first restricted resource class (RRC) identifier from the entry, the first RRC identifier identifying the first class of resources in which the requested resource is a member.

19. The system of claim 18, wherein determining the second class of resources the application is entitled comprises obtaining the second RRC identifier from the resource entitlement of the application, and wherein the application is allowed to access the requested resource if the first and second RRC identifiers are matched.

20. The system of claim 18, wherein the ACL is centrally maintained by a security manager of the operating system.

21. The system of claim 17, wherein determining the first class of resources the requested resource belongs comprises:
  accessing metadata of the requested resource that is stored as part of one or more attributes of the requested resource; and
  obtaining the first restricted resource class (RRC) identifier from the metadata, the first RRC identifier identifying the first class of resources in which the requested resource is a member.

22. The system of claim 17, further comprising: in response to determining that the first RRC identifier matches the second RRC identifier that is in the application entitlements, allowing the application to access other restricted resources in the plurality of restricted resources associated with the first RRC identifier.

23. A computer-implemented method, comprising:
  receiving, by an access control manager, from a first application, one or more entitlements encoded in the application, the entitlements including one or more restricted resource class (RRC) identifiers, wherein a restricted resource class identifier represents a class of a plurality of restricted resources and the application is entitled to access any of the plurality of restricted resources in the restricted resource class for which the application has an entitlement with the RRC identifier for the restricted resource class;
  receiving, by the access control manager, a request from the first application to attach to a second application or to control the second application;
  accessing, by the access control manager, an access control list (ACL) to determine whether the second application is associated with a restricted resource class (RRC) based on an RRC identifier associated with the second application, wherein the restricted resource class comprises a plurality of restricted resources;
  in response to determining that the second application is in the access control list and belongs to the restricted resource class:
    determining, by the access control manager, from the access control list, whether the RRC identifier associated with the second application is found in the entitlements received from the first application, indicating that the first application is allowed to attach to, or control, the second application;
    allowing, by the access control manager, the first application to attach to, or control, the second application in response to determining that the RRC identifier associated with the second application is found in the entitlements received from the first application;
    denying, by the access control manager, the first application to attach to, or control, the second application in response to determining that the RRC identifier associated with the second application is not found in the entitlements received from the first application;
  in response to determining, by the access control manager, that the second application does not belong to a restricted resource class, allowing, by the access control manager, the first application to attach to, or control, the second application.

24. The method of claim 23, wherein the resource entitlement of the second application identifies the first application.

25. The method of claim 23, wherein the first application is to debug the second application through attachment.

26. A computer-implemented method, comprising:
  receiving, by an access control manager, from an application, one or more entitlements encoded in the application, the entitlements including one or more restricted resource class (RRC) identifiers, wherein a restricted resource class identifier represents a class of a plurality of restricted resources and the application is entitled to access any of the plurality of restricted resources in the restricted resource class for which the application has an entitlement with the RRC identifier for the restricted resource class;
  receiving, by the access control manager, a request from the application for accessing a kernel component of a kernel of an operating system of a data processing system, the application having an application identifier;
  accessing, by the access control manager, an access control list (ACL) to determine whether the kernel component is associated with a restricted resource class (RRC) based on an RRC identifier associated with the kernel component, wherein the restricted resource class comprises a plurality of restricted resources;
  in response to determining that the kernel component is in the access control list and is associated with an RRC identifier:

determining, by the access control manager, whether the restricted resource class identifier associated with the kernel component is found within the entitlements received from the application; and allowing, by the access control manager, the application to access the kernel component in response to determining that the restricted resource class identifier associated with the kernel component being found in the entitlements received from the application, independent of the application identifier.

27. The method of claim 26, wherein the kernel component is a device driver for accessing a peripheral device of the data processing system.

28. The method of claim 26, wherein the request for accessing a kernel component is to launch a kernel extension within the kernel of the operating system.

29. The method of claim 23, wherein the first application requests to control to the second application, and the access control manager allows the first application to control at least a portion of operations of the second application in response to the access control manager determining that the RRC identifier associated with the second application is found in the entitlements received by the access control manager from the first application.

30. The method of claim 1, wherein a restricted resource class comprises one of: a block device class, a storage class, a system framework, or a kernel component of a system.

* * * * *